US010381613B2

(12) United States Patent
Qiu

(10) Patent No.: US 10,381,613 B2
(45) Date of Patent: Aug. 13, 2019

(54) DETACHABLE BATTERY RACK

(71) Applicant: Ningbo Futai Electric Co., Ltd., Ningbo, Zhejiang (CN)

(72) Inventor: Fujun Qiu, Ningbo (CN)

(73) Assignee: Ningbo Futai Electric Limited, Ningbo, Zhejiang (CN)

( * ) Notice: Subject to any disclaimer, the term of this patent is extended or adjusted under 35 U.S.C. 154(b) by 389 days.

(21) Appl. No.: 15/159,789

(22) Filed: May 19, 2016

(65) Prior Publication Data

US 2016/0344001 A1 Nov. 24, 2016

(30) Foreign Application Priority Data

May 22, 2015 (CN) .................... 2015 2 0333417 U

(51) Int. Cl.
*H01M 2/10* (2006.01)
*H01M 2/30* (2006.01)
(52) U.S. Cl.
CPC ........... *H01M 2/1022* (2013.01); *H01M 2/30* (2013.01)
(58) Field of Classification Search
None
See application file for complete search history.

(56) References Cited

U.S. PATENT DOCUMENTS

| 2001/0046624 | A1* | 11/2001 | Goto | H01M 2/105 429/99 |
| 2005/0254234 | A1* | 11/2005 | Wang | F21L 4/027 362/184 |
| 2008/0166629 | A1* | 7/2008 | Shiau | H01M 2/0257 429/169 |
| 2011/0177374 | A1* | 7/2011 | Maguire | H01M 2/1077 429/120 |
| 2016/0293910 | A1* | 10/2016 | Claudel | H01M 2/105 |

* cited by examiner

*Primary Examiner* — Haroon S. Sheikh
(74) *Attorney, Agent, or Firm* — Raymond Y. Chan; David and Raymond Patent Firm

(57) ABSTRACT

A detachable battery rack includes a battery rack body, an anode end portion and a cathode end portion, wherein the battery rack body includes at least two rack panels which defines a battery cavity to install batteries, wherein the anode end portion, which is detachable mounted to the battery rack body, includes an anode conductive plate detachably coupled to the rack panels, and the cathode end portion, which is detachable mounted to the battery rack body, includes a cathode conductive plate detachably coupled to the rack panels, wherein the anode conductive plate and the cathode conductive plate are respectively provided at two opposite sides of the rack panels.

16 Claims, 15 Drawing Sheets

DETACHABLE BATTERY RACK

BACKGROUND OF THE PRESENT INVENTION

Field of Invention

The present invention relates to a battery rack, and more particularly to a detachable battery rack.

Description of Related Arts

A battery is an electrochemical device with the ability to convert chemical energy into electrical energy. A battery, which is a container which has an accommodation space shaped like a cup, or a groove, or the accommodation space is a partial space of an another container or a composite container, is provided with inside electrolyte solutions and metal electrodes to generate electric currents. The models of batteries are various according to the size and battery capacity, such as No. 1, No. 2, No. 5, No. 7 and so on. The No. 5 (AA battery) and No. 7 (AAA battery) model of batteries are common used in daily life.

Batteries are commonly used as portable power sources in household appliances, especially in small handhold appliances such as a flashlight, a lantern and so on. The batteries of the household appliances which are mentioned above have predetermined designed accommodation space and cannot be changed once the manufacturing of the household appliances are completed. For example, the accommodation space of the battery in the body of a flashlight matches with the volume of No. 5 or No. 7 model battery. That is to say, one certain type of household appliance can only use a matched model battery with certain accommodation space as power source. As a result, there is limitation on the choice of portable power supply when people use a household appliance. What is more, people cannot use a household appliance just because that he cannot get a matched specific model of battery in certain cases.

In order to solve the above problems, a battery rack which has an ability to integrate multiple models of batteries into one single battery pack having a matched volume with the corresponding battery accommodation cavity is developed. For example, a China Patent No. CN201853750U disclosed a battery rack which comprises an insulation main body, a front cover and a rear cover, wherein the front cover and the rear cover are arranged at the front end and the rear end of the insulation main body, the insulation main body comprises at least an accommodating cavity for accommodating a battery, the front cover and the rear cover are printed circuit board assemblies, the front cover comprises a printed circuit board, an elastic anode, an elastic cathode, a battery anode contact element and a battery cathode contact element, wherein the elastic anode and the elastic cathode are arranged on the outer surface of the printed circuit board opposite to the containing cavity; and the battery anode contact element and the battery cathode contact element are arranged on the inner surface of the printed circuit board facing to the accommodating cavity, the rear cover comprises a printed circuit board, a battery anode contact element and a battery cathode contact element, wherein the battery anode contact element and the battery cathode contact element are arranged on the inner surface of the printed circuit board facing to the accommodating cavity. The battery rack cannot be detachable efficiently and is not portable to carry as the battery has to be used in matching small handle household appliances.

It is necessary to develop a detachable battery rack which can overcome these disadvantages.

SUMMARY OF THE PRESENT INVENTION

The invention is advantageous in that it provides a detachable battery rack, wherein the detachable battery rack has a simplified structural configuration and is detachable.

Another advantage of the invention is to provide a detachable battery rack, wherein the detachable battery rack is adapted for people to easily and efficiently assemble and disassemble members of the detachable battery.

Another advantage of the invention is to provide a detachable battery rack, wherein the detachable battery rack is able to be detachable efficiently.

Another advantage of the invention is to provide a detachable battery rack, wherein the detachable battery rack is portable to carry.

Another advantage of the invention is to provide a detachable battery rack, wherein the detachable battery rack has a simple structure and a low manufacturing cost.

Another advantage of the invention is to provide a detachable battery rack, wherein no expensive or complicated structure is required to employ in the present invention in order to achieve the above mentioned objectives.

Additional advantages and features of the invention will become apparent from the description which follows, and may be realized by means of the instrumentalities and combinations particular point out in the appended claims.

According to the present invention, the foregoing and other objects and advantages are attained by a detachable battery rack comprising a battery rack body, an anode end portion and a cathode end portion, wherein the battery rack body comprises at least two rack panels which defines a battery cavity to install batteries, wherein the anode end portion, which is detachable mounted to the battery rack body, comprises an anode conductive plate detachably coupled to the rack panels, and the cathode end portion, which is detachable mounted to the battery rack body, comprises a cathode conductive plate detachably coupled to the rack panels, wherein the anode conductive plate and the cathode conductive plate are respectively provided at two opposite sides of the rack panels.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
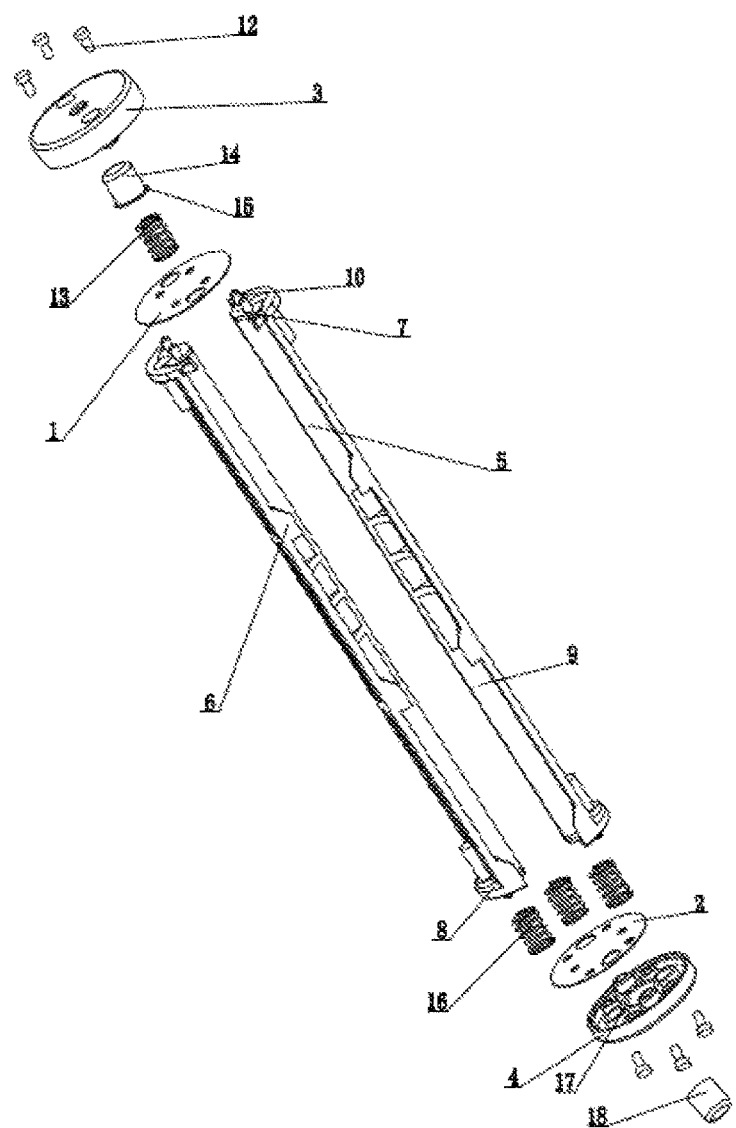
FIG. 1 is an exploded perspective view of a detachable battery rack according to a preferred embodiment of the present invention.
Figure 2:
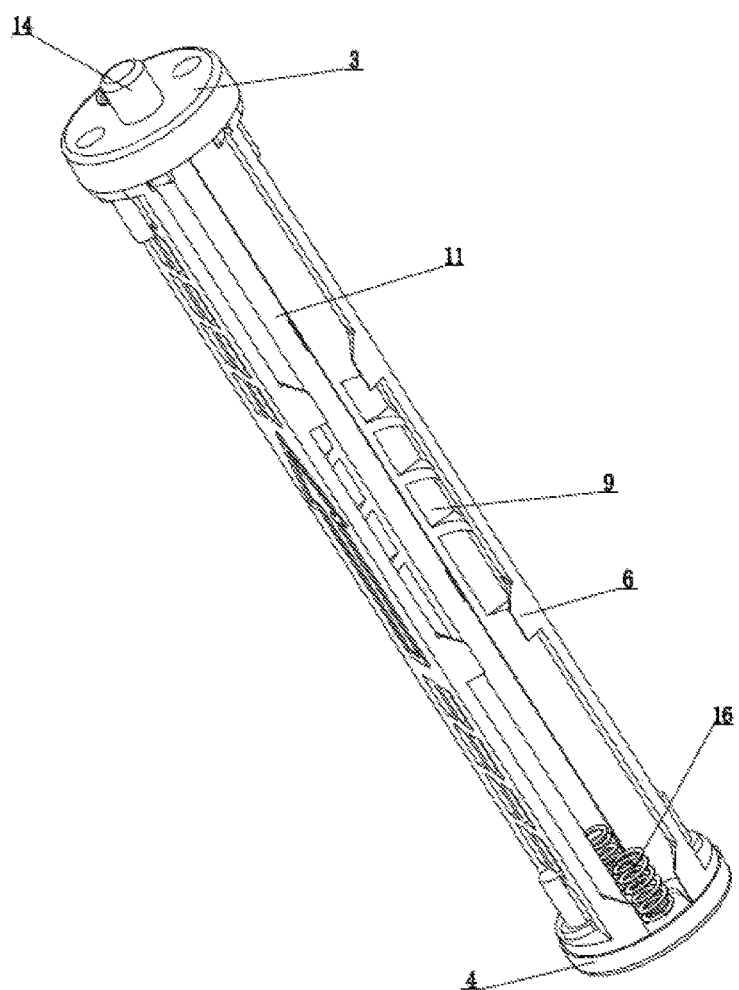
FIG. 2 is a perspective view of a detachable battery rack in an assembled state according to the above preferred embodiment of the present invention.

Referring to FIG. 1 to FIG. 2 of the drawings, a detachable battery rack applied to an appliance such as a flashlight according to a preferred embodiment is illustrated, in which the detachable battery rack comprises a battery compartment, an anode conductive plate 1, a cathode conductive plate 2, an anode cover 3 and a cathode cover 4. The battery compartment is formed by two compartment plates 5, each of the two compartment plates 5 further comprises an upper portion 7, a lower portion 8 and a plate rib portion 9 between the upper portion 7 and the lower portion 8. Each of the upper portion 7 and the lower portion 8 comprises a retention post 10 on the surface thereof. The two upper portions 7 constitute an upper mounting surface part of the battery compartment. The two lower portions 8 constitute a lower mounting surface part of the battery compartment. The two ribbed plate portions 9 form two chambers 11 and each of the two chambers accommodates three AA batteries. The upper mounting surface part of the battery compartment and the lower mounting surface part of the battery compartment communicate to the chamber 11. The anode conductive plate 1 fits closely to the upper mounting surface part of the battery compartment and fastens with the upper mounting surface part of the battery compartment by a screw 12. The screw 12 and the retention post 10 in the same orientation penetrate through the anode conductive plate 1. A coil spring 13 and an anode conductive end cap 14 are provided on the outside of the anode conductive plate 1. The coil spring 13 is provided inside of the anode conductive end cap 14. A stopper collar 15 is provided on the bottom of the anode conductive end cap 14. The anode conductive plate 1, the coil spring 13 and the anode conductive end cap 14 are covered within the anode cover 3. A lid port of the anode cover 3 fastens with a peripheral edge of the upper mounting surface part of the battery compartment. The anode conductive end cap 14 penetrates the anode cover 3 and extends outside of the anode cover 3. The stopper collar 15 contacts closely with the inner wall of the anode cover 3 by the coil spring 13. The cathode conductive plate 2 fits closely to the lower mounting surface part of the battery compartment and fastens with the lower mounting surface part of the battery compartment by the screw 12. The screw 12 and the retention post 10 on the same orientation penetrate into the cathode conductive plate 2. A plurality of cathode conductive springs 16 are provided on the cathode conductive plate 2. The number of the cathode conductive springs 16 is identical with the number of the chambers 11. The cathode conductive springs 16 are located inside the corresponding chamber 11. The cathode conductive plate 2 is covered within the cathode cover 4. A lid port of the cathode cover 4 fastens with a peripheral edge of the lower mounting surface part of the battery compartment. The cathode cover 4 further has a central through hole 17 corresponding to the cathode conductive plate 2. The detachable battery rack of the present invention further comprises a cathode conductive terminal post 18. The cathode conductive terminal post 18 interchangeable plugs into the central through hole 17. Meanwhile, in order to enhance the stability of a model battery in the chamber 11 of the battery compartment, one or more retention rib 6 is provided on the side of each ribbed plate portion 9 of the compartment plate 5. Each of the retention rib 6 is located at the opening of each corresponding chamber 11.

Figure 3:
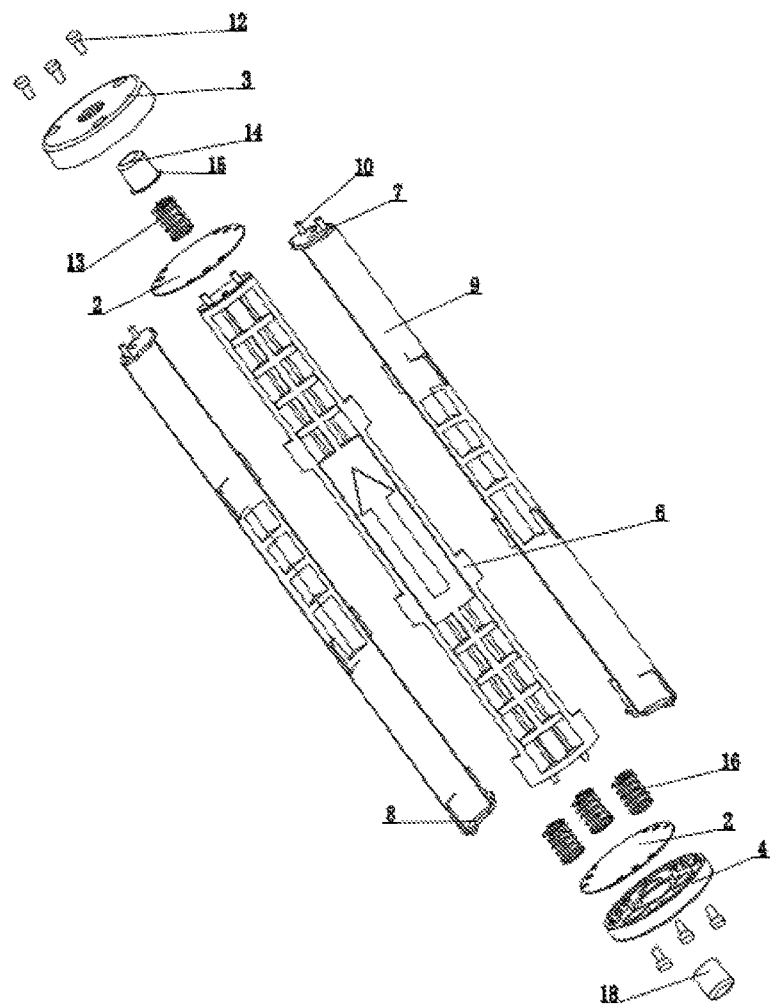
FIG. 3 is an exploded perspective view of a detachable battery rack according to a first alternative mode of the above preferred embodiment of the present invention.
Figure 4:
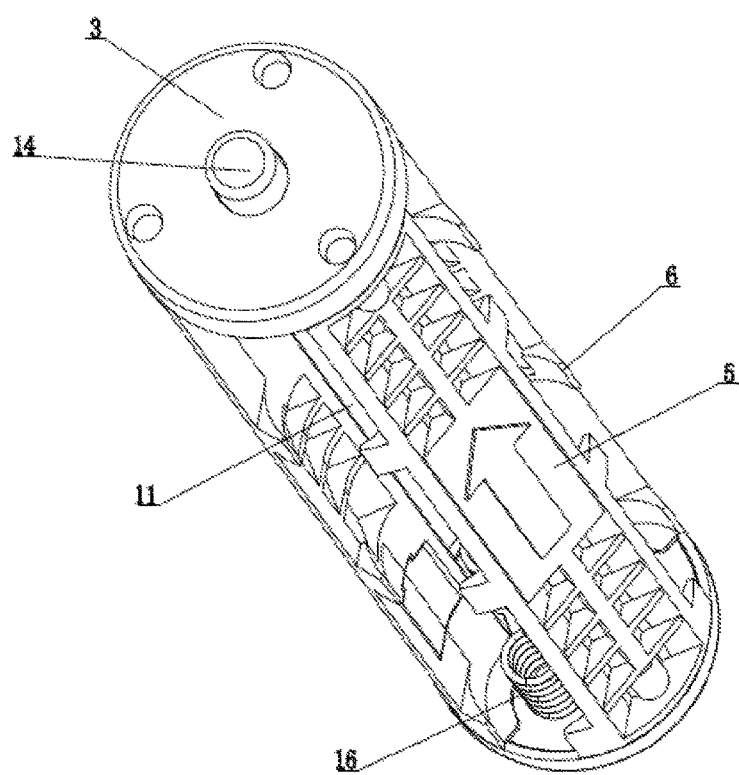
FIG. 4 is a perspective view of the detachable battery rack according to the above first alternative mode of the above preferred embodiment of the present invention.
Figure 5:
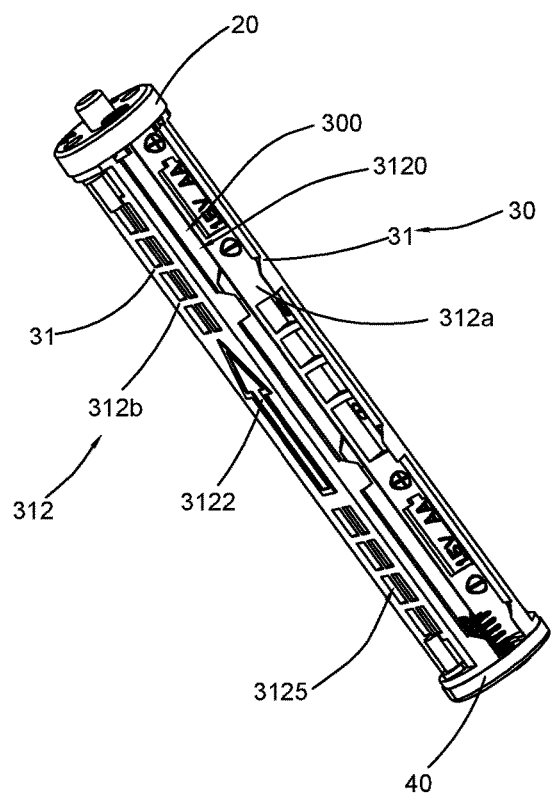
FIG. 5 is a perspective view of a detachable battery rack according to a second alternative mode of the above preferred embodiment of the present invention.

As shown in FIG. 3 and FIG. 4, a detachable battery rack according to a first alternative mode of the preferred embodiment is illustrated, wherein the detachable battery rack comprises an anode conductive plate 1, a cathode conductive plate 2, an anode cover 3, a cathode cover 4 and a battery compartment which comprises three compartment plates 5. Each of the three compartment plates 5 further comprises an upper portion 7, a lower portion 8 and a plate rib portion 9 between the upper portion 7 and the lower portion 8. Each of the upper portion 7 and the lower portion 8 comprises a to retention post 10 on the surface. The three upper portions 7 constitute an upper mounting surface part of the battery compartment. The three lower portions 8 constitute a lower mounting surface part of the battery compartment. The three ribbed plate portions 9 together separate the battery compartment into three chambers 11 and each of the three chambers has a capacity of three AA batteries. The upper mounting surface part of the battery compartment and the lower mounting surface part of the battery compartment link up the chamber 11. The anode conductive plate 1 is jointed to the upper mounting surface part of the battery compartment and fastened with the upper mounting surface part of the battery compartment by a screw 12. The screw 12 and the retention post 10 on the same direction penetrate through the anode conductive plate 1. A coil spring 13 and an anode conductive end cap 14 are provided outside of the anode conductive plate 1. The coil spring 13 is provided inside of the anode conductive end cap 14. A stopper collar 15 is provided on the bottom of the anode conductive end cap 14. The anode conductive plate 1, the coil spring 13 and the anode conductive end cap 14 are covered within the anode cover 3. A lid port of the anode cover 3 fastens with a peripheral edge of the upper mounting surface part of the battery compartment. The anode conductive end cap 14 penetrates the anode cover 3 and extends to the outside of the anode cover 3. The coil spring 13 contacts the stopper collar 15 closely with the inner wall of the anode cover 3. The cathode conductive plate 2 contacts closely to the lower mounting surface part of the battery compartment. The screw 12 fastens the cathode conductive plate 2 with the lower mounting surface part of the battery compartment. The screw 12 and the retention post 10 in the same orientation penetrate through the cathode conductive plate 2. A plurality of cathode conductive springs 16 are provided on the cathode conductive plate 2. The number of the cathode conductive springs 16 equals to the number of the chambers 11. The cathode conductive springs 16 are mounted inside the corresponding chamber 11. The cathode conductive plate 2 is covered within the cathode cover 4. A lid port of the cathode cover 4 fastens with a peripheral edge of the lower mounting surface part of the battery compartment. The cathode cover 4 further has a central through hole 17 corresponding to the cathode conductive plate 2. The detachable battery rack of the present invention further comprises a cathode conductive terminal post 18. The cathode conductive terminal post 18 interchangeable plugs into the central through hole 17. Meanwhile, in order to enhance the overall stability of a model battery installed in the chamber 11 of the battery compartment, one or more retention rib 6 is provided on the side of each ribbed plate portion 9 of the compartment plate 5. Each of the retention rib 6 is located at a periphery edge of an opening of each corresponding chamber 11.

As shown in FIG. 5 to FIG. 8, a detachable battery rack according to a second alternative mode of the preferred embodiment is illustrated, wherein the detachable battery rack comprises a battery rack body 30, a cathode end portion 40 provided on one end of the battery rack body 30, and an anode end portion 20 provided on the other end of the battery rack body 30. The cathode end portion 40, the anode end portion 20 and the battery rack body 30 define a battery cavity 300 to install batteries 50 therein. The battery cavity 300 is able to accommodate a plurality of batteries 50 such that the attachable battery rack applies to different kinds of electric appliances. The cathode end portion 40 and the anode end portion 20 are detachable connected with the battery rack body 30.

According to this preferred embodiment, the battery rack body 30 further comprises two rack panels 31 spacedly arranged with each other and defining two battery compartments 310. Each of the two battery compartments 310 is able to accommodate one or more such as three batteries 50, as shown in FIG. 6B of the drawings, the two battery compartments 310 can be configured to receive the same model of batteries or can be configured to receive different models of batteries respectively. In other words, the two rack panels 31 divides the battery cavity 300 into two battery compartments 310 so that the battery cavity 300 is able to accommodate in a total of six batteries. Each of the two rack panels 31 further comprises a first end panel 311, a second end panel 313 and a side panel 312 connecting the first end panel 311 and the second end panel 313. In other words, the first end panel 311 extends transversely and inwardly from one end of the side panel 312, and the second end panel 313 extends transversely and inwardly from the other end of the side panel 312.

In other words, each of the first end panel 311, the second end panel 313 and the side panel 312 form a half of one battery compartment 310. The two rack panels 31 matches with each other to form the two battery compartments 310. The two first end panels 311 match with each other and form a cathode mounting surface part of the battery rack body 30. The two second end panels 313 match with each other and form an anode mounting surface part of the battery rack body 30.

It is worth mentioning that the shape of the side panel 312 is consistent with the shape of a battery. In other words, the side panel 312 has a predetermined curve corresponding to the model of batteries.

It is worth mentioning that the side panel 312 further comprises an inner mark 3121 on an inner surface 312a of the side panel 312 so as to mark a right mounting direction of batteries on the battery compartment 310 and an outer mark 3122 on an outer surface 312b of the side panel 312 so as to make a right mounting direction of the detachable battery rack on an electrical appliance.

It is worth mentioning that the side panel 312 further comprises a middle ridge 3126 protruded at a middle of the inner surface 312a. In other words, when two side panels 312 fit together, the two middle ridges 3126 divide the battery cavity 300 into two battery compartments 310. In order to enhance the stability of a battery in the battery compartment 310, the side panel 312 further comprises one or more retention rib 3124 inwardly protruded on the lateral edge of the side panel 312. For example, according to this preferred embodiment, each of the battery compartments 310 is provided with two pairs of the retention ribs 3124, and each pair of the retention ribs 3124 comprises one retention rib 3124 formed on one side panel 312 and another retention rib 3124 formed on the other side panel 312, so that three batteries in each of the battery compartments 310 are respectively retained in position by the two pairs of the retention ribs 3124. In other words, the two side panels 312 define two openings 3120 for placing batteries into the battery compartments 310 respectively, and each battery compartment 310 is provided with two pairs of the retention ribs 3124 each having two retention ribs 3124 formed at the two side panels respectively and extending into the openings 3120 for retaining the batteries.

It is worth mentioning that the side panel 312 may further comprise a plurality of discontinuous grooves arranged on the outer surface 312b of the side panel 312 in order to enhance the mounting stability of the detachable battery rack by increasing the friction.

It is worth mentioning that the each side panel 312 further comprises a plurality of spacing guard sheets 3123 arranged on the inner surface 312a of the side panel 312 for narrowing down the gap between the two side panels 312 and enhance the stability of a battery in the battery compartment 310.

Figure 6A:
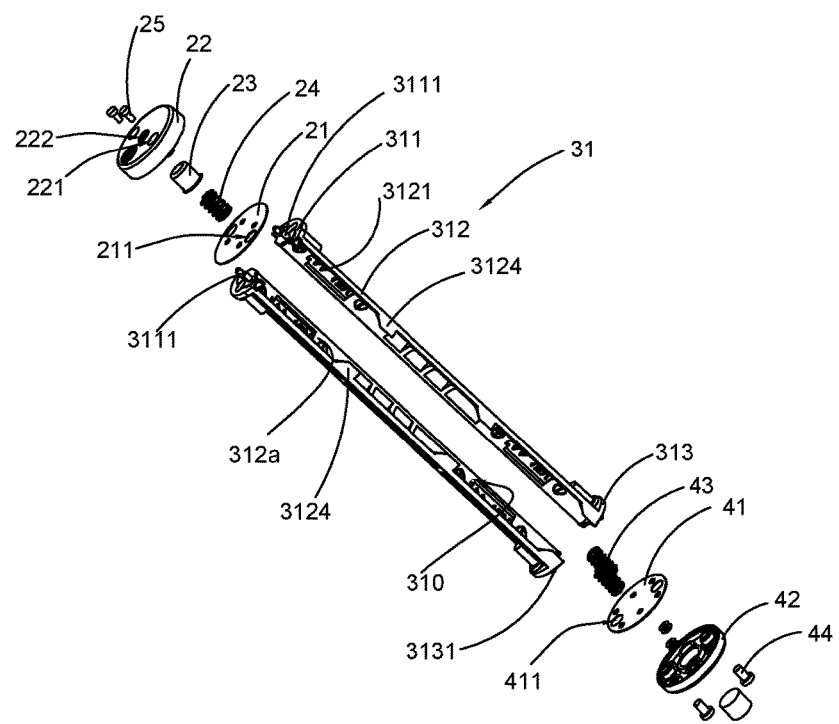
FIG. 6A is an exploded perspective view of the detachable battery rack according to the second alternative mode of the above preferred embodiment of the present invention.
Figure 6B:
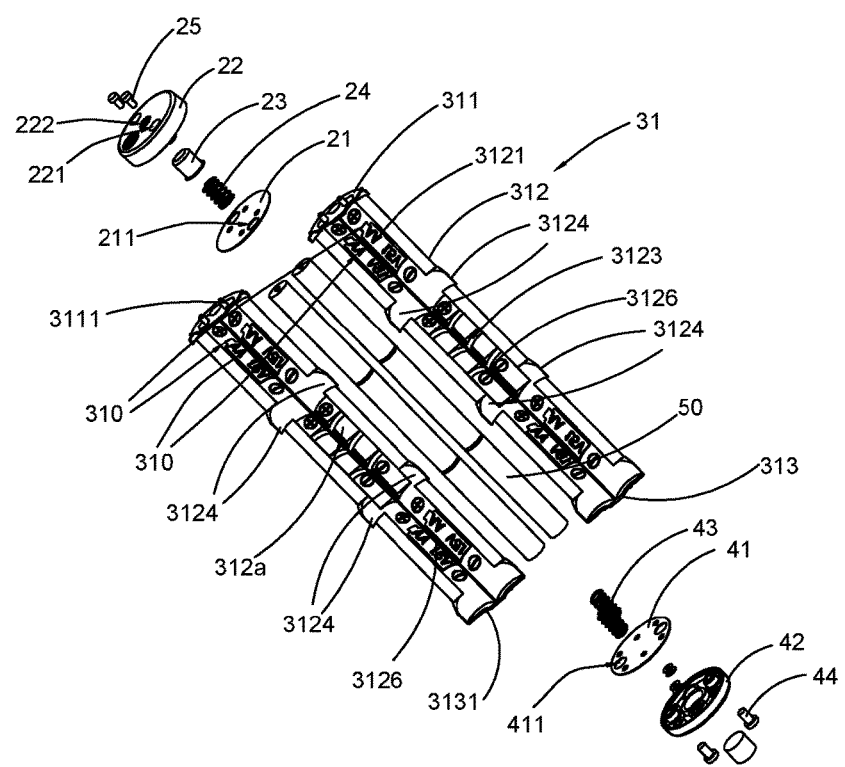
FIG. 6B is an another exploded perspective view of the detachable battery rack with batteries according to the second alternative mode of the above preferred embodiment of the present invention.
Figure 7A:
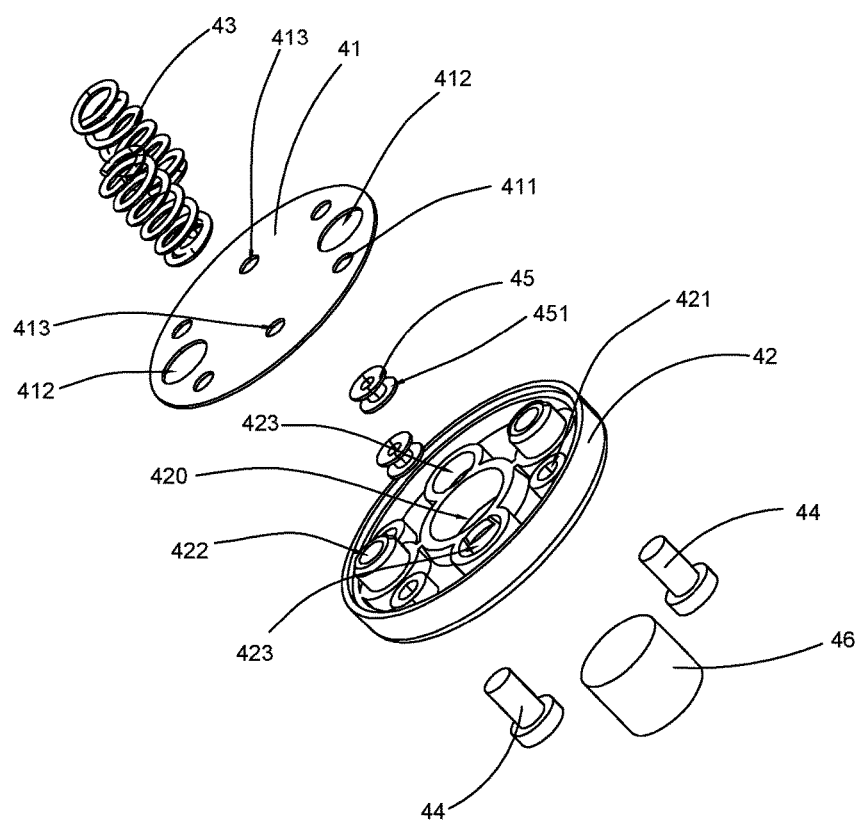
FIG. 7A is a partial enlarged exploded view of the detachable battery rack according to the above second alternative mode of the preferred embodiment of the present invention.
Figure 7B:
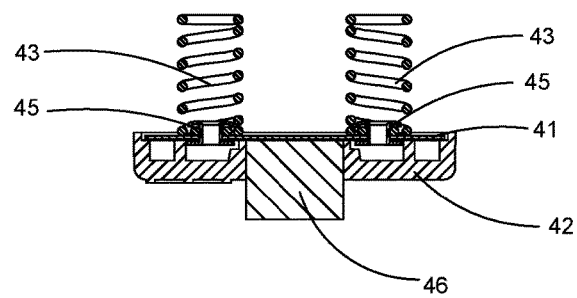
FIG. 7B is a partial enlarged perspective view of the detachable battery rack according to the above second alternative mode of the preferred embodiment of the present invention.

As shown in FIG. 6A and FIG. 6B, the anode end portion 20 further comprises an anode conductive plate 21, an anode cover 22, an anode conductive end cap 23, a conductive elastic member 24 and an anode fastening member 25. Preferably, the conductive elastic member 24 is a spring which is inserted in the anode conductive end cap 23, and the anode fastening member 25 is a screw.

Two of the first end panels 311 form an anode mounting surface part of the battery rack body 30 and two of the second end panels 313 form a cathode mounting surface part of the battery rack body 30. The anode conductive plate 21 fits to the anode mounting surface part of the battery rack body 30. The first end panel 311 further comprises an anode retention post 3111 and the anode conductive plate 21 has an anode retention hole 211. The anode retention post 3111 is retained in the anode retention hole 211. In other words, the anode conductive plate 21 connects the two rack panels 31 together. A lower part of the anode cover 22 fastens with a peripheral edge of the anode mounting surface part of the rack body 30.

The anode cover 22 has a center hole 222 and the anode conductive end cap 23 passes through the center hole 222. The conductive elastic member 24 is provided inside of the anode conductive end cap 23 in such a manner that the anode conductive end cap 23 are extended to an outside of the anode cover 22.

The anode conductive plate 21 has an anode fastening hole 212 and the anode cover 22 has an mounting hole 221. The anode fastening member 25 penetrates through the anode fastening hole 212 and the mounting hole 221. The anode conductive plate 21 is covered within the anode cover 22. A stopper collar 231 is provided on the bottom of the anode conductive end cap 23. In other words, the anode conductive end cap 23 penetrates the anode cover 22 and extends outside of the anode cover 22. The anode fastening member 25 fastens the anode cover 22 with the anode conductive plate 21. The fastening member stopper collar 231 prevents the body of the anode conductive end cap 23 from escaping to the outside of the anode cover 22.

The cathode end portion 40 further comprises a cathode conductive plate 41, a cathode cover 42, a cathode elastic member 43 and a cathode fastening member 44. Preferably, the cathode elastic member 43 is a spring, and the cathode fastening member 44 is a screw.

The cathode conductive plate 41 fits to the cathode mounting surface part of the battery rack body 30. The second end panel 313 further comprises a cathode retention post 3131 and the cathode conductive plate 41 has a cathode limited hole 411. The cathode retention post 4111 is retained in the cathode retention hole 411. In other words, the cathode conductive plate 41 connects the two rack panels 31 together. An upper portion of the cathode cover 42 fastens with a peripheral edge of the cathode mounting surface part of the rack body 30.

The cathode conductive plate 41 has a cathode fastening hole 412 and the cathode cover 42 has a cathode mounting hole 422, the cathode fastening member 44 passes through the cathode fastening hole 412 and the cathode mounting hole 422 so as to fasten the cathode conductive plate 41 with the cathode cover 42.

The cathode end portion 40 further comprises at least one connecting member 45 connecting the cathode elastic member 43 to the cathode cover 42. The cathode conductive plate 41 has a through hole 413 and the cathode cover 42 has a retaining groove 423. Each of the connecting member 45, which is mounted in the retaining grove 423, has a middle retaining slot 451 for mounting a lower end of the cathode elastic member 43 which is embodied as a coil spring in this preferred embodiment. Accordingly, the power portion of the cathode elastic member 43 passes through the through hole 413 and is retained in the middle retaining slot 451 of the connecting member 45. Alternatively, the connecting member passes through the through hole 413 for engaging with the lower portion of the cathode elastic member 43. The number of the cathode elastic members 43 is identical with the number of the battery compartments 310. In the alternative mode of the present invention, the two cathode elastic members 43 are located inside the battery compartments 310 respectively.

The detachable battery rack of the present invention further comprises a cathode conductive terminal post 46. The cathode cover 42 further has a central through hole 420, and the cathode conductive terminal post 46 interchangeable plugs into the central through hole 420 to electrically connect to the cathode conductive plate 41.

Figure 8:
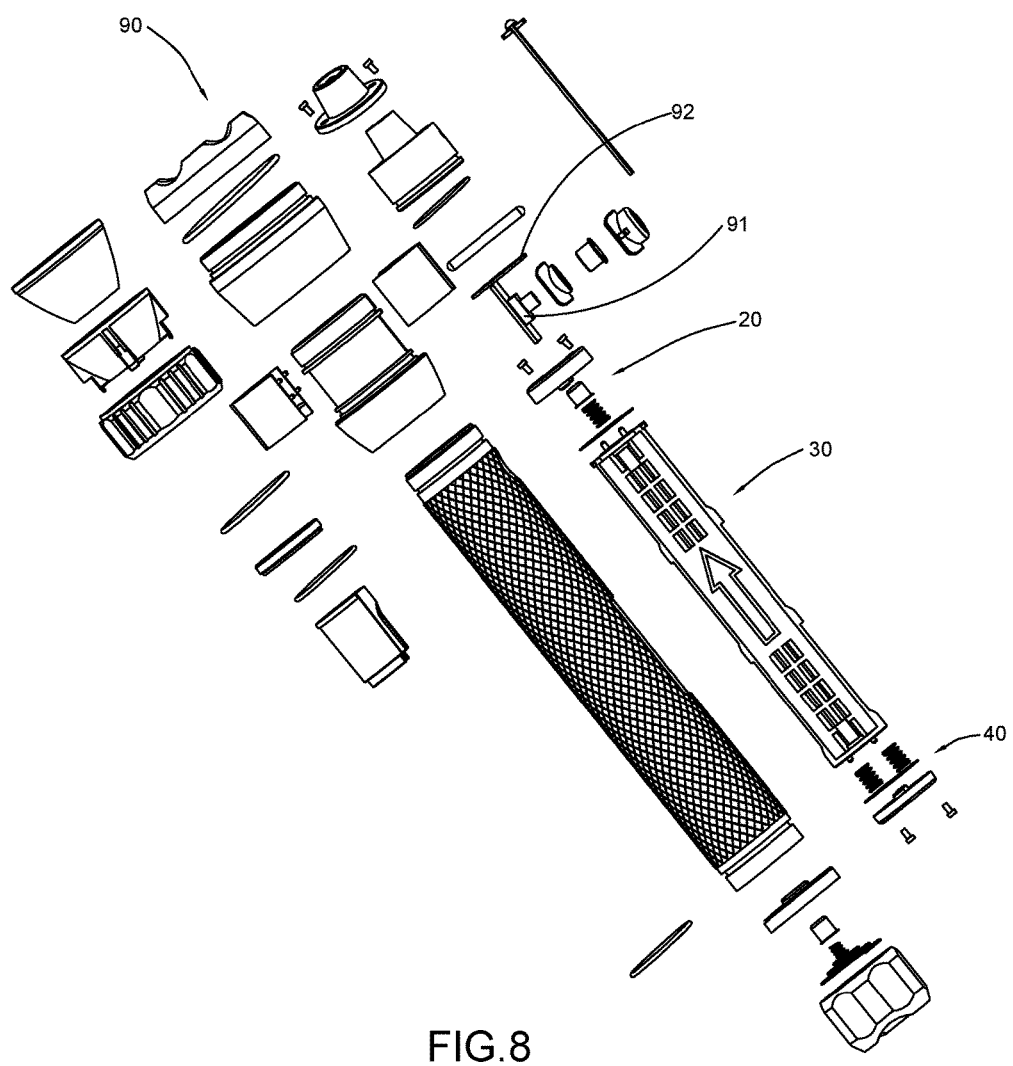
FIG. 8 is an exploded perspective view of the detachable battery rack which is incorporated in a flashlight according to the above second alternative mode of the above preferred embodiment of the present invention.
Figure 9:
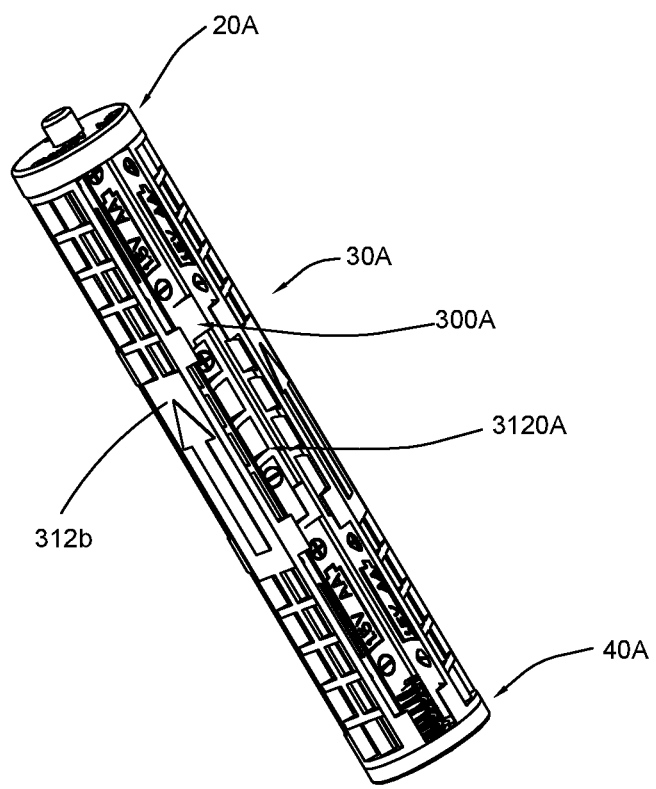
FIG. 9 is perspective view of a detachable battery rack according to a third alternative mode of the above preferred embodiment of the present invention.

As shown in FIG. 8, the detachable battery rack is applied to a flashlight 90. The detachable battery rack is electrically connected with a switch 91, a circuit board 92 of the flashlight 90. In a prior art, the circuit board is fixed with the battery rack, a certain battery rack is able to be used only in a certain flashlight as a result. The detachable battery rack of the present invention is detachable itself and changes the capacity of batteries, and the circuit board 92 is fixed with the flashlight 90, simple detachable battery racks are able to apply to different flashlights and fits different battery capacity needs of electric appliances.

As shown in FIG. 9 to FIG. 12, a detachable battery rack according to a third alternative mode of the preferred embodiment is illustrated, wherein the detachable battery rack comprises a battery rack body 30A, an anode end portion 20A provided on one end of the battery rack body 30A, and a cathode end portion 40A provided on the other end of the battery rack body 30A. The anode end portion 20A, the cathode end portion 40A and the battery rack body 30A define a battery cavity 300A to install batteries therein. The battery cavity 300A is able to accommodate a plurality of batteries such that the attachable battery rack applies to different kinds of electric appliances. The cathode end portion 40A and the anode end portion 20A are detachable connected with the battery rack body 30A.

The battery rack body 30A further comprises three rack panels 31A defining three battery compartments 310A. Each of the three battery compartments 310A is able to accommodate three batteries. In other words, the three rack panels 31A divide the battery cavity 300A into three battery compartments 310A so that the battery cavity 300A is able to accommodate in a total of nine batteries. Each of the three rack panels 31A further comprises a first end panel 311A, a second end panel 313A and a side panel 312A connecting the first end panel 311A and the second end panel 313A. In other words, the first end panel 311A extends transversely and inwardly from one end of the side panel 312A, and the second end panel 313A extends transversely and inwardly from the other end of the side panel 312A. The side panel 312A further comprises a middle ridge 3126A protruded at the middle of the inner surface 312a. In other words, when the three side panels 312A fit together, the three middle ridges 3126A divide the battery cavity 300A into three battery compartments 310A.

Figure 10A:
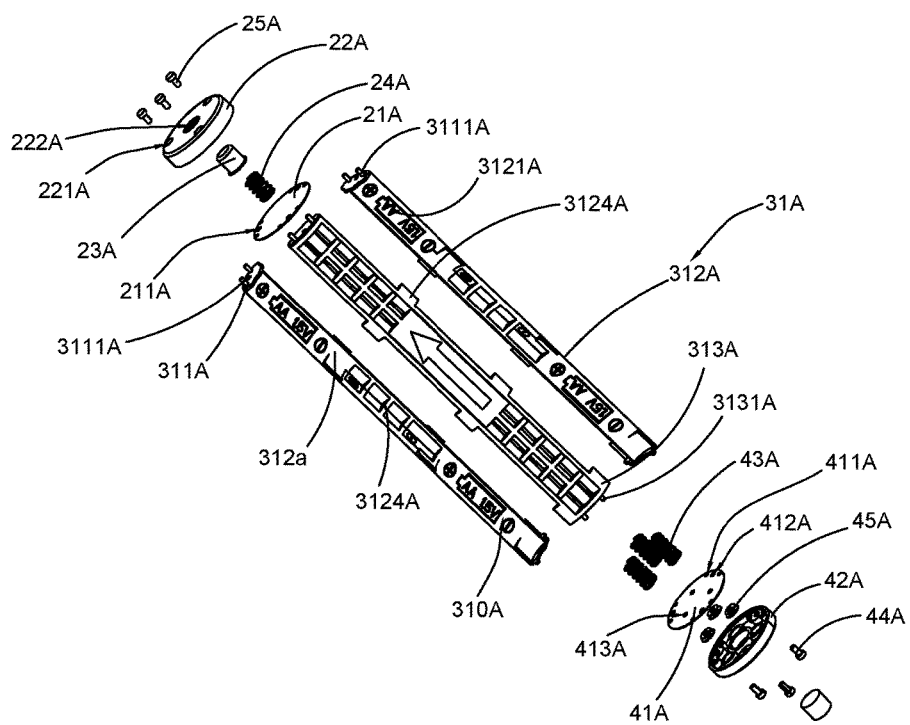
FIG. 10A is an exploded perspective view of the detachable battery rack according to the above third alternative mode of the preferred embodiment of the present invention.
Figure 10B:
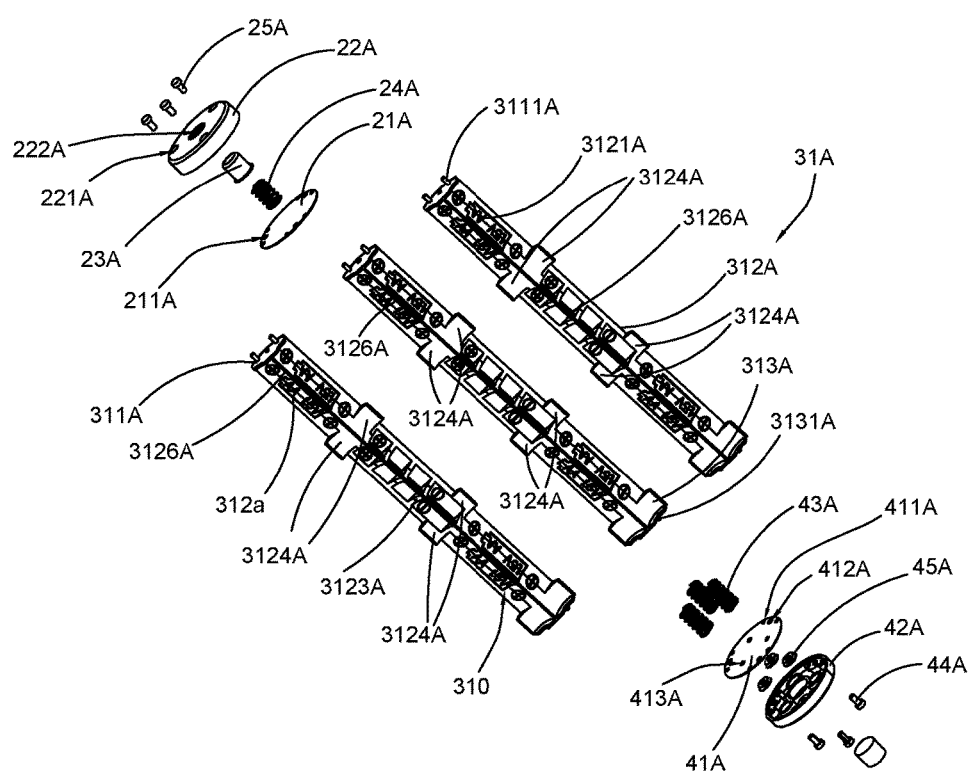
FIG. 10B is an another exploded perspective view of the detachable battery rack according to the above third alternative mode of the preferred embodiment of the present invention.
Figure 11:
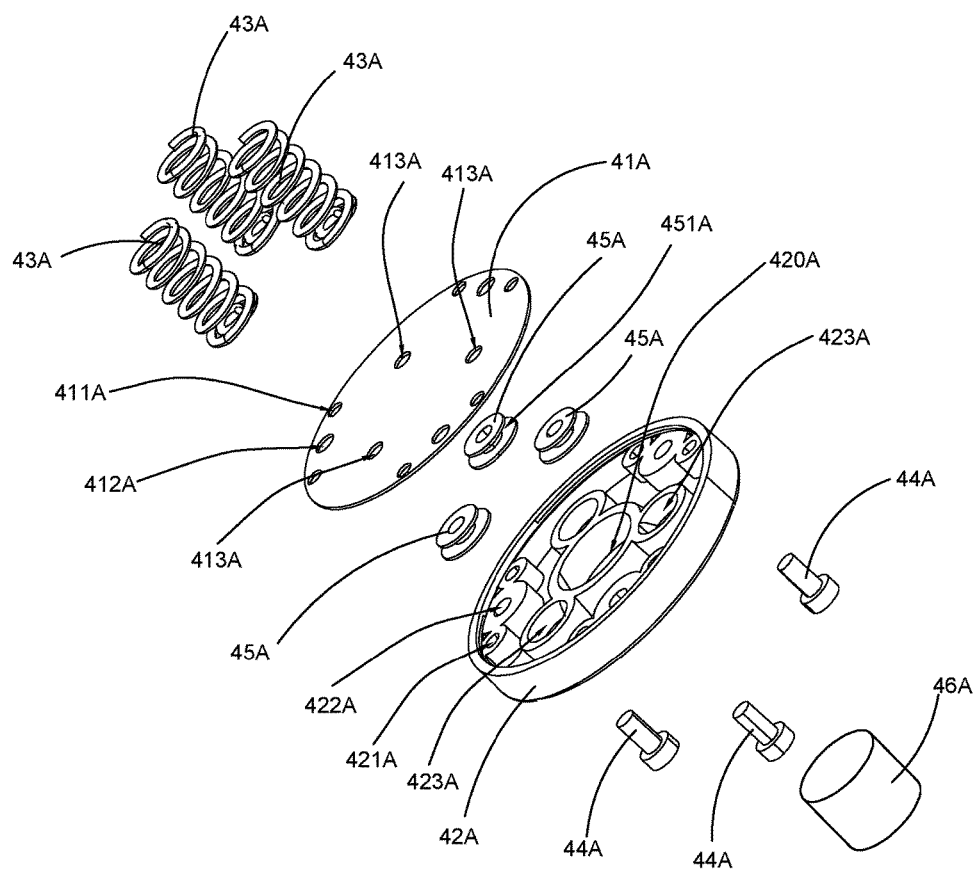
FIG. 11 is partial enlarged perspective view of the detachable battery rack according to the above third alternative mode of the preferred embodiment of the present invention.

As shown in FIG. 10, the anode end portion 20A further comprises an anode conductive plate 21A, an anode cover 22A, an anode conductive end cap 23A, a conductive elastic member 24A and an anode fastening member 25A. Preferably, the conductive elastic member 24A is a spring, and the anode fastening member 25A is a screw.

Three first end panels 311A form an anode mounting surface part of the battery rack body 30A and three second end panels 313A form a cathode mounting surface part of the battery rack body 30A. The anode conductive plate 21A fits to the anode mounting surface part of the battery rack body 30A. The first end panel 311A further comprises at least one anode retention post 3111A and the anode conductive plate 21A has at least one anode retention hole 211A. The anode retention post 3111A is retained in the anode retention hole 211A. In other words, the anode conductive plate 21A connects the three rack panels 31A together. The anode cover 22A fastens with a peripheral edge of the anode mounting surface part of the rack body 30A.

The conductive elastic member 24A is provided at an outside of the anode conductive plate 21A, the anode cover 22A has a center hole 222A and the anode conductive end cap 23A passes through the center hole 222A. The conductive elastic member 24A is provided inside of the anode conductive end cap 23A. The anode conductive plate 21A is covered within the anode cover 22A. A stopper collar 231A is provided on the bottom of the anode conductive end cap 23A. In other words, the anode conductive end cap 23A penetrates the anode cover 22A and extends to the outside of the anode cover 22A in such a manner that the stopper collar 231A prevent the body of the anode conductive end cap 23A from escaping to the outside of the anode cover 22A.

In order to fasten the anode cover 22A with the anode conductive plate 21A by the anode fastening member 25A, the anode conductive plate 21A has an anode fastening hole 212A and the anode cover 22A has an mounting hole 221A. The anode fastening member 25A passes through the anode fastening hole 212A and the mounting hole 221A.

The cathode end portion 40A further comprises a cathode conductive plate 41, a cathode cover 42A, a cathode elastic member 43A and a cathode fastening member 44A. Preferably, the cathode elastic member 43A is a spring, and the cathode fastening member 44A is a screw.

The cathode conductive plate 41A is fitted to the cathode mounting surface part of the battery rack body 30A. The second end panel 313A further comprises at least one cathode retention post 3131A and the cathode conductive plate 41A has at least one cathode retention hole 411A. The cathode retention post 4111A is retained in the cathode limited hole 411A. In other words, the cathode conductive plate 41A connects the three rack panels 31A together. The cathode cover 42A is fastened with a peripheral edge of the cathode mounting surface part of the rack body 30A.

The cathode conductive plate 41A has a cathode fastening hole 412A and the cathode cover 42A has a cathode mounting hole 422A, the cathode fastening member 44A passes through the cathode fastening hole 412A and the cathode mounting hole 422A so as to fasten the cathode conductive plate 41A with the cathode cover 42A.

The cathode end portion 40A further comprises at least one connecting member 45A connecting the cathode elastic member 43A to the cathode cover 42A. The cathode conductive plate 41A has a through hole 413A and the cathode cover 42A has a retaining groove 423A. Each connecting member 45A is arranged for mounting the corresponding cathode elastic member 43A which may be embodied as a coil spring. The number of the cathode elastic members 43A matches with the number of the battery compartments 310A. In the third alternative mode of the present invention, the three cathode elastic members 43A are located inside the three battery compartments 310A respectively.

It is worth mentioning that in order to enhance the stability of a battery in the battery compartment 310A, the side panel 312A further comprises one or more retention rib 3124A inwardly protruded on the lateral edge of the side panel 312A. For example, according to this preferred embodiment, each of the battery compartments 310A is provided with two pairs of the retention ribs 3124A each having two retention ribs 3124 formed at the two side panels 312A respectively and extending into the openings 3120A for retaining the batteries It is worth mentioning that the shape of the side panel 312A is consistent with the shape of a battery. In other words, the side panel 312A has a predetermined curve corresponding to the model of the batteries.

It is worth mentioning that the side panel 312A further comprises an inner mark 3121A on an inner surface 312a of the side panel 312A so as to mark a right mounting direction of batteries on the battery compartment 310A and an outer mark 3122A on an outer surface 312bA of the side panel 312A so as to make a right mounting direction of the detachable battery rack on an electrical appliance.

It is worth mentioning that the side panel 312A further comprises a plurality of discontinuous grooves arranged on the outer surface 312b of the side panel 312A in order to enhance the mounting stability of the detachable battery rack by increasing the friction.

It is worth mentioning that the side panel 312A further comprises a plurality of spacing guard sheets 3123A arranged on the inner surface 312a of the side panel 312A for enhancing the stability of a battery in the battery compartment 310A.

Figure 12:
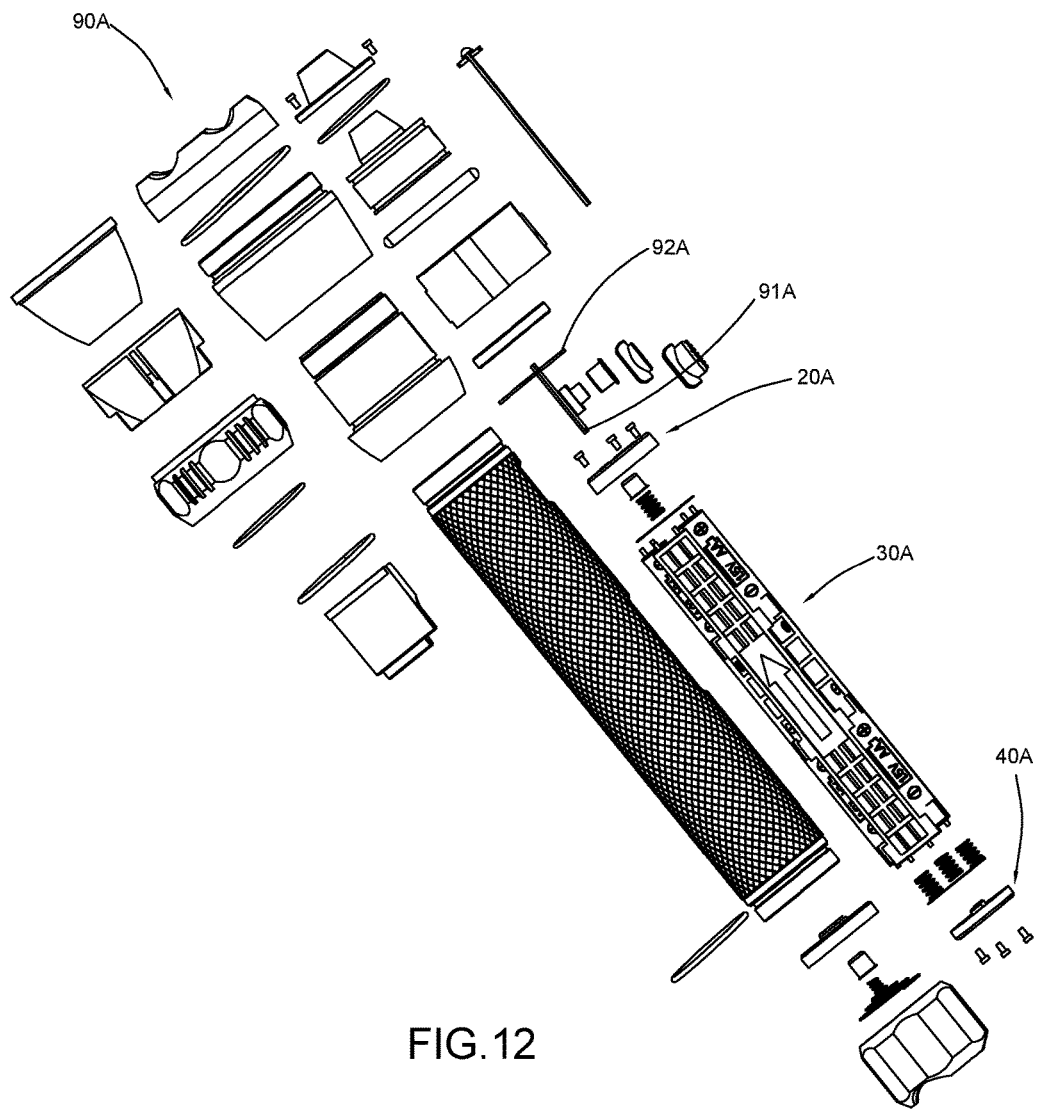
FIG. 12 is an exploded perspective view of the detachable battery rack which is incorporated in a flashlight according to the above third alternative mode of the preferred embodiment of the present invention.

The battery rack of the present invention is able to be detachable efficiently and is portable to carry as one detachable battery rack is able to be used in many handle household appliances such as flashlights. As shown in FIG. 12, the detachable battery rack is applied to a flashlight 90A. The detachable battery rack is electrically connected with a switch 91A, a circuit board 92A of the flashlight 90A. The detachable battery rack of the present invention is detachable itself and changes the capacity of batteries, and the circuit board 92A is fixed with the flashlight 90A, simple detachable battery racks are able to apply to different flashlights and fits different battery capacity needs of electric appliances.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A detachable battery rack, comprising:
   a battery rack body which comprises two or more rack panels, wherein each of said rack panels comprises a side panel, and first and second end panels transversely extended from two opposite ends of said side panel respectively to define an opening and a battery cavity for receiving one or more batteries between said first and second end panels;
   an anode end portion which comprises an anode conductive plate detachably coupled with said first end panels of said rack panels; and
   a cathode end portion which comprises a cathode conductive plate detachably coupled with said second end panels of said rack panels.

2. The detachable battery rack, as recited in claim 1, wherein anode end portion further comprises a plurality of anode retention holes formed at said anode conductive plate and a plurality of anode retention posts formed at said first end panels of said rack panels respectively to penetrate through said anode retention holes respectively so as to detachably couple said first end panels of said rack panels with said anode conductive plate.

3. The detachable battery rack, as recited in claim 2, wherein anode end portion further comprises a plurality of cathode retention holes formed at said cathode conductive plate and a plurality of cathode retention posts formed at said second end panels of said rack panels respectively to penetrate through said cathode retention holes respectively so as to detachably couple said second end panels of said rack panels with said cathode conductive plate.

4. The detachable battery rack, as recited in claim 3, wherein said anode end portion further comprises an anode cover, an anode conductive end cap penetrating said anode cover and extending outside of said anode cover, and at least one anode fastening member fastening said anode cover with said anode conductive plate to cover said anode conductive plate within said anode cover.

5. The detachable battery rack, as recited in claim 4, wherein said cathode end portion further comprises a cathode cover, at least one cathode elastic member connected to said cathode conductive plate and at least one cathode fastening member fastening said cathode cover with said cathode conductive plate, so as to cover said cathode conductive plate within said cathode cover, wherein said cathode elastic member is a spring.

6. The detachable battery rack, as recited in claim 5, further comprising a cathode conductive terminal post, wherein said cathode cover further has a central through hole that said cathode conductive terminal post being interchangeably plugged into said central through hole to connect to said cathode conductive plate.

7. The detachable battery rack, as recited in claim 6, wherein said anode end portion further comprises a conductive elastic member inserted in said anode conductive end cap.

8. The detachable battery rack, as recited in claim 7, further comprising a stopper collar provided at a bottom of said anode conductive end cap for preventing said anode conductive end cap from escaping from said anode cover.

9. The detachable battery rack, as recited in claim 4, wherein said anode end portion further comprises a conductive elastic member inserted in said anode conductive end cap.

10. The detachable battery rack, as recited in claim 9, further comprising a stopper collar provided at a bottom of said anode conductive end cap for preventing said anode conductive end cap from escaping from said anode cover.

11. The detachable battery rack, as recited in claim 5, wherein said cathode end portion further comprises at least one connecting member having a middle retaining slot, wherein said cathode conductive plate has at least one through hole and said cathode cover has at least one retaining groove, wherein said connecting member is received in said retaining groove and passes through said through hole, wherein said cathode elastic member is embodied as a coil spring which comprises an end which is retained in said middle retaining slot of said connecting member.

12. The detachable battery rack, as recited in claim 1, wherein said anode end portion further comprises an anode cover, an anode conductive end cap penetrating said anode cover and extending outside of said anode cover, and at least one anode fastening member fastening said anode cover with said anode conductive plate to cover said anode conductive plate within said anode cover.

13. The detachable battery rack, as recited in claim 12, wherein said cathode end portion further comprises a cathode cover, at least one cathode elastic member connected to said cathode conductive plate and at least one cathode fastening member fastening said cathode cover with said cathode conductive plate, so as to cover said cathode conductive plate within said cathode cover, wherein said cathode elastic member is a spring.

14. The detachable battery rack, as recited in claim 13, further comprising a cathode conductive terminal post, wherein said cathode cover further has a central through hole that said cathode conductive terminal post being interchangeably plugged into said central through hole to connect to said cathode conductive plate.

15. The detachable battery rack, as recited in claim 1, wherein each of said side panels comprises a middle ridge protruded at a middle of an inner side of said side panel, wherein when said rack panels are coupled with each other, said battery cavities are separated by said middle ridges.

16. The detachable battery rack, as recited in claim 1, wherein each of said rack panels further comprises at least one retention rib protruded along an edge of each of said side panels and is extended into said opening.

* * * * *